March 16, 1965  A. J. VODINELICH  3,173,234
BLADE LOCKING DEVICE FOR ROTARY LAWN MOWERS
Filed Dec. 13, 1963
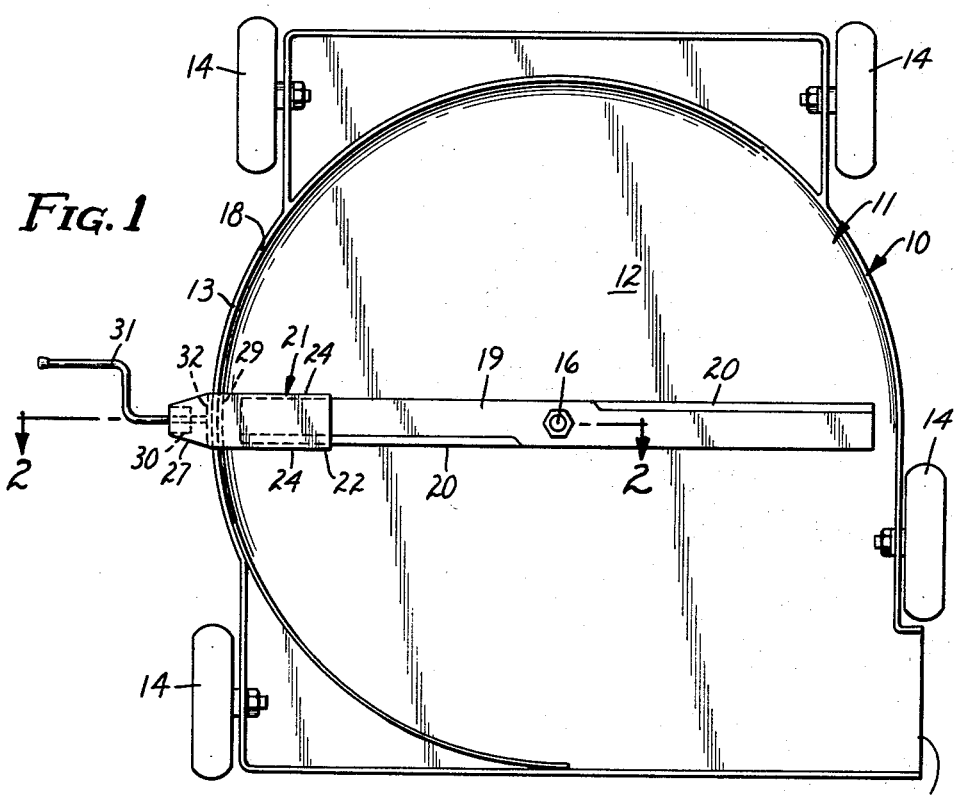
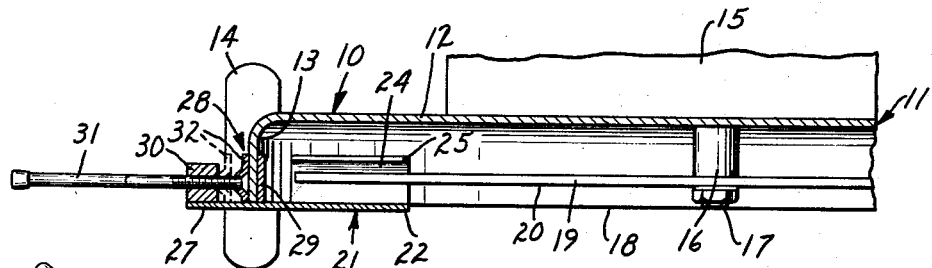
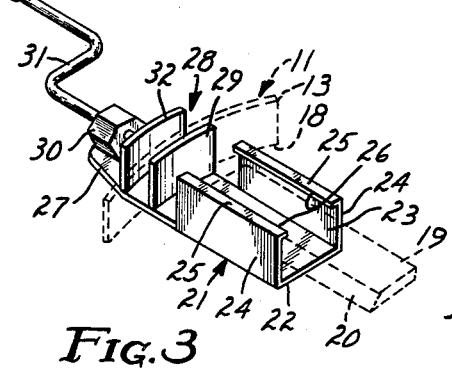
INVENTOR.
ANTHONY J. VODINELICH
BY
Merchant, Merchant + Gould
ATTORNEYS

3,173,234
BLADE LOCKING DEVICE FOR ROTARY LAWN MOWERS
Anthony J. Vodinelich, 240 19th Ave., South St. Paul, Minn.
Filed Dec. 13, 1963, Ser. No. 330,422
3 Claims. (Cl. 56—25.4)

My invention relates generally to safety devices for lawn mowers, and more particularly, to lawn mowers of the rotary type.

Still more specifically, my invention relates to rotary lawn mowers of the type wherein a horizontally disposed cutter blade is mounted for rotation on a vertical axis within a housing having a generally imperforate top wall and a depending circumferentially extended marginal wall which is generally concentric to said vertical axis.

Numerous injuries have resulted from one's attempting to remove the rotary blade from the shaft upon which it is mounted, for purposes of sharpening, straightening, replacement, or the like. Such injuries are due to the starting of the internal combustion engines, generally associated with such mowers, upon partial rotation of the blade and power shaft during such maneuvers.

The primary object of my invention is the provision of novel means for positively locking the blades of such mowers against rotation during removal thereof.

A further object of my invention is the provision of a device of the class above described which may be secured in operative position upon mowers of varying makes and designs with complete safety and in a minimum of time.

A further object of my invention is the provision of a device of the class above described which is inexpensive to produce, is light in weight, and foolproof in its operation.

The above and still further objects of my invention will become apparent from the following detailed specification, appended claims, and attached drawings.

Referring to the drawings wherein like characters indicate like parts throughout the several views:

FIG. 1 is a view in bottom plan of a conventional rotary lawn mower, illustrating my novel safety device secured thereto;

FIG. 2 is an enlarged fragmentary view in vertical section as seen from the line 2—2 of FIG. 1; and FIG. 3 is a perspective view of my novel device, portions of the mower being shown by dotted lines.

Referring with greater particularity to the drawings, the numeral 10 indicates in its entirety a conventional rotary mower, the inverted cup-like housing 11 of which includes a generally imperforate horizontally disposed top wall 12, from the marginal edges of which depend a circumferentially extended side wall or flange 13. For purposes of mobility, the housing 11 is suitably mounted on wheels 14. Extending downwardly through the top wall 12, generally axially of the flange 13, and associated with a motor 15, only partially shown, is a vertically disposed power shaft 16.

Secured to the lower end 17 of the power shaft 16 for rotation in a horizontal plane slightly above the lower edge 18 of the side wall or flange 13 is a cutter blade 19, the leading edges 20 of the opposite ends of which are sharpened for cutting purposes.

My novel safety device comprises an elongated horizontal disposed base plate 21, formed from metal or other suitable material. At its inner end portion 22 the base plate 21 is formed to define a longitudinally extended upwardly opening channel 23, the opposite side walls 24 of which are preferably integrally formed with the base plate 21. At their upper ends the side walls 24 are preferably inturned to define opposed lips 25 and a restricted mouth 26 for a purpose which will hereinafter be explained. It suffices to state at the moment that the blade 19 can enter the channel 23 only when the base plate 21 is rocked about its longitudinal axis so as to cause successive passage of the opposite longitudinal edges thereof through the restricted mouth 26.

Supported on the outer end portion 27 of the base 21, in longitudinally spaced relationship to the channel 23, is a C-clamp, identified in its entirety by 28, and comprising an upstanding arcuate fixed jaw element 29, immediately adjacent the channel 23, a threaded nut 30 fast on the extreme outer end of the base plate 21, a crank-equipped screw 31 having threaded relation with the nut 30, and a movable jaw element 32, which, as shown, has an arc corresponding to that of the fixed jaw element 29 and is parallel thereto. As shown, this arc corresponds generally to that of the arc of the side wall or flange 13 of the conventional rotary mower 10 adapted to be clampingly received between jaw elements 29, 32. The extreme inner end of the screw 31 extends through and is journalled for rotation with respect to the movable jaw element 32.

When it is desired to affix my novel safety device to the blade 19 of a conventional mower 10, it is but necessary to turn same on its side so that the position of the blade 19 within the housing 11 can be determined. One end of the blade 19 will always be closely spaced with respect to the circumferentially extended side wall 13, irrespective of whether the other end is adjacent the discharge opening 33. Consequently, such adjacent end is caused to be received within the channel 23 through the restricted open mouth 26 thereof. Simultaneously, the adjacent portion of the wall 13 will be caused to be received between the fixed and movable jaw elements 29, 32. Finally, when rotary movements are imparted to the screw 31, the side wall 13 is securely clamped therebetween. The blade 19 may now be removed from the lower end 17 of the shaft 16 with complete safety. The opposed lips 25 tend to positively preclude escape of the blade 19 from the channel 23.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:
1. In a device of the class described,
    (a) a housing having a generally imperforate top wall and a depending circumferentially extended marginal wall,
    (b) an elongated horizontally disposed cutter blade mounted for rotation within said housing on a vertical axis generally concentric to the axis of said marginal wall,
    (c) an elongated base plate,
    (d) means on the inner end of said base plate defining an upwardly opening longitudinally extended channel receiving one end of said rotary blade,
    (e) and means on the radially outer end of said base plate defining an upwardly opening C-clamp, the longitudinal axis of the mouth of which is normal to the longitudinal axis of said channel, and which receives said depending marginal wall.
2. The structure defined in claim 1 in which the upstanding side walls of said channel are integrally formed with said base plate and are angularly disposed at the upper edges to define opposed lips.

3. The structure defined in claim 2 in which said C-clamp comprises:
 (a) an upstanding arcuate fixed jaw element adjacent said channel,
 (b) a nut in longitudinally outwardly spaced relation to said fixed jaw element,
 (c) a crank-equipped screw having threaded relationship with said nut, and
 (d) a movable jaw element rotatively carried by the extended inner end of said screw.

References Cited by the Examiner
UNITED STATES PATENTS

| 1,057,499 | 4/13 | Renholtsen | 269—249 X |
| 1,495,189 | 5/24 | Mack | 248—226 X |
| 2,846,908 | 8/58 | Kelly | 269—98 |
| 2,998,476 | 8/61 | Nix | 248—72 X |
| 3,057,140 | 10/62 | Ridenour et al. | 56—25.4 |

T. GRAHAM CRAVER, *Primary Examiner.*

RUSSELL R. KINSEY, *Examiner.*